Patented Mar. 29, 1932

1,851,070

UNITED STATES PATENT OFFICE

RICHARD TOBLER, OF BASEL, SWITZERLAND, ASSIGNOR TO FIRM: SOCIETY OF CHEMICAL INDUSTRY IN BASLE, OF BASEL, SWITZERLAND

INDIGOID DYESTUFFS AND PROCESS OF MAKING SAME

No Drawing. Application filed January 23, 1930, Serial No. 422,947, and in Switzerland February 2, 1929.

The present invention relates to new indigoid dyestuffs which are valuable for the production of fast tints. It comprises the process of making the new dyestuffs, the dyestuffs themselves, and the material dyed with the new dyestuffs.

It has been found that new indigoid dyestuffs may be obtained as follows:

In a first step chloroacidyl-o-toluidine $$(CH_3 : NHacidyl : Cl = 1 : 2 : 4)$$

is transformed into dichloroacidyl-o-toluidine $(CH_3 : NHacidyl : Cl : Cl = 1 : 2 : 4 : 5)$ by treating chloro-acidyl-o-toluidine with chlorinating agents, such as chlorine or sulfuryl chloride.

In a second step the said dichloro-acidyl-o-toluidine is converted into dichloro-o-toluidine $(CH_3 : NH_2 : Cl : Cl = 1 : 2 : 4 : 5)$ by treatment with saponifying agents, such as solutions of caustic alkalies or mineral acids.

In a third step the dichloro-o-toluidine $(CH_3 : NH_2 : Cl : Cl = 1 : 2 : 4 : 5)$ is converted into xanthic acid dichlorotolyl ester by diazotization and combining of the diazo compound obtained with an alkali salt of xanthic acid.

In a fourth step the product thus formed is transformed into the dichlorothiocresol $(CH_3 : SH : Cl : Cl = 1 : 2 : 4 : 5)$ by treatment with saponifying agents, such as solutions of caustic alkalies.

In a fifth step the said dichlorothiocresol is converted into the 2-methyl-4:5-dichlorophenyl-thioglycollic acid by condensation with a mono-halogen-acetic acid.

In a sixth step the product thus formed is condensed by means of condensing agents, such as chlorosulfonic acid or chlorosulfonic acid and dehydrated boric acid, to the corresponding 4:5-dichloro-7-methyl-3-hydroxythionaphthene.

In a seventh step the 4:5-dichloro-7-methyl-3-hydroxythionaphthene is treated with aromatic nitroso compounds, such as, for instance, p-nitroso-dimethylaniline or p-nitrosophenol, to form an anil of the 4:5-dichloro-7-methylthionaphthenequinone-2:3.

In an eighth step the product obtained by the process of the sixth and seventh step, which has the general formula

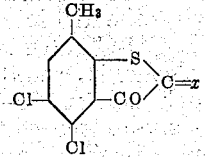

wherein $x$ stands for a reactive group, such as anil or 2H, is condensed with compounds of the general formula

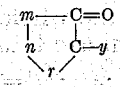

wherein $y$ represents a reactive group, such as O, halogen, anil, 2H, and $m$, $n$ and $r$ represent atoms of which two are carbon atoms adjacent to each other, which at the same time appertain to an aromatic ring system, and of which the third is NH, S or C.

Such compounds are for instance five-membered condensed ring systems, as for example isatins, indoxyls, thionaphthenequinones-2:3, hydroxythionaphthenes, naphthohydroxythiophenes, acenaphthenequinones-8, and the like, their homologues and substitution products, anils and halides.

This reaction takes place by heating the components in a solvent which may act as condensing agent.

The dyestuffs thus obtained may further be converted into dyestuffs containing more halogen by subsequent halogenation. They correspond with the general formula

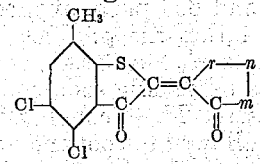

wherein, $r$, $m$ and $n$ have the signification as has hereinbefore defined. They form red to violet and Bordeaux powders, which dissolve in concentrated sulfuric acid to form violet to greenish-blue and green solutions, yielding with hydrosulfite and caustic soda solution orange-brown to orange, yellow and olive vats from which cotton is dyed fast red to violet and Bordeaux tints.

The following examples illustrate the invention, but without limiting it, the parts being by weight:

*Example 1*

183.5 parts of chloracetyl-o-toluidine
$$(CH_3:NH\text{-}CO\text{-}CH_3:Cl=1:2:4)$$
made in known manner by acidylating chloro-o-toluidine $(CH_3:NH_2:Cl=1:2:4)$ with acetic anhydride are dissolved in 920 parts of acetic acid of 90 per cent. strength. After addition of 100 parts of sodium acetate 75 parts of chlorine are allowed to flow into the solution within 3 hours while stirring at 80–90° C. Stirring is continued for some hours at the same temperature, whereupon the reaction mixture is diluted with 5000 parts of water, filtered, washed free of acid, followed by drying the dichlor-acetyl-o-toluidine $(CH_3:NH\text{-}CO\text{-}Cl:Cl=1:2:4:5)$ obtained. From alcohol it crystallizes in colorless crystals which melt at 170–171° C.

218 parts of the dichloroacetyl-o-toluidine thus obtained are dissolved in 2000 parts of alcohol, adding 400 parts of caustic alkali, whereupon the whole is boiled for 3 to 5 hours while stirring. After the alcohol has been distilled off, the whole is distilled with steam and the dichlor-o-toluidine $$(CH_3:NH_2:Cl:Cl=1:2:4:5)$$

obtained from the distillate by filtration.

176 parts of the thus obtained dichlor-o-toluidine are diazotized in known manner and the mixture is introduced into a solution of 180 parts of potassium xanthate and 160 parts of soda ash at 70° C. When evolution of gas has come to an end, the mixture is allowed to cool and extracted with ether. The ether is evaporated and the residue, which consists very probably of the xanthic acid dichlorotolylester of the formula

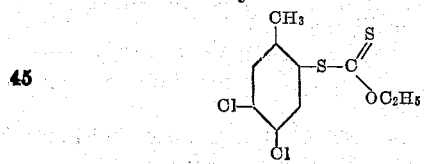

is saponified by heating it in a reflux apparatus with 250 parts of caustic soda solution of 40° Bé. and 600 parts of alcohol, and in the same solution the product is condensed with 140 parts of chloroacetic acid, dissolved in 168 parts of caustic soda solution of 40° Bé. and water. The alcohol is distilled and the residue allowed to cool and acidified with hydrochloric acid. The 2-methyl-4:5-dichloro-phenyl-thioglycollic acid corresponding with the formula

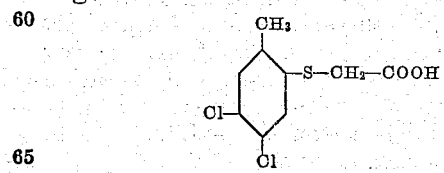

is filtered and dried. When recrystallized from benzene it forms white needles, which melt at 84° C.

251 parts of the thus obtained 2-methyl-4:5-dichlorophenyl-thioglycollic acid are introduced at −10° to −15° C., while stirring, into a solution of 65 parts dehydrated boric acid in 2500 parts of chlorosulfonic acid. After stirring for 10–15 hours at the said temperature, the reaction mixture is poured on ice while stirring. After filtration the 4:5-dichloro-7-methyl-3-hydroxythionaphthene is obtained, having the following formula

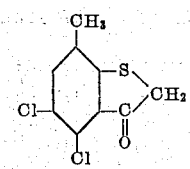

It is a colorless powder which crystallizes from dilute alcohol in colorless needles, melting at 173° C. By condensation with p-nitrosodimethylaniline it can be transformed in known manner into the p-dimethylamino-anil of the 4:5-dichloro-7-methylthionaphthenequinone-2:3.

*Example 2*

216 parts of 5:7-dichlorisatin are converted into the 5:7-dichlorisatin-α chloride by heating them for an hour at 100–110° C. with 2500 parts of chlorobenzene and 206.5 parts of phosphorus pentachloride. After the mass has cooled to 80° C. there is run in while stirring, a solution of 233 parts of 4:5-dichloro-7-methyl-3-hydroxythionaphthene in 2000 parts of chlorobenzene. After a short time the formation of dyestuff is finished. The dyestuff is filtered and washed with benzene, whereby it is obtained in the form of a violet powder having the following formula

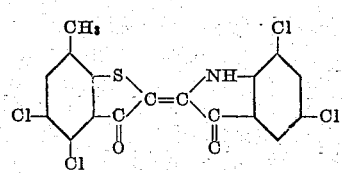

It dissolves in concentrated sulfuric acid to form a greenish blue solution. With hydrosulfite and caustic soda solution it yields an orange vat, in which the fiber is dyed very fast violet tints.

*Example 3*

233 parts of 4:5-dichloro-7-methyl-3-hydroxythionaphthene and 182 parts of acenaphthene-quinone-β are suspended in 1800 parts of glacial acetic acid and after addition of 10 parts of concentrated hydrochloric acid the suspension is heated to boiling, while stirring. After a short time the condensation is complete, the dyestuff of the formula

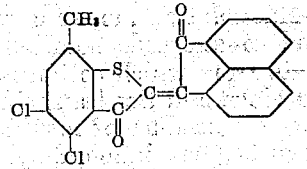

is filtered, washed with glacial acetic acid and dried. It is a red powder which dissolves in concentrated sulfuric acid to form a green solution. It yields an orange brown vat and dyes cotton red tints of very good fastness.

The same dyestuff is obtained by condensing the p-dimethylaminoanil of the 4:5-dichloro-7-methylthionaphthenequinone-2:3 with acenaphthenone.

*Example 4*

362 parts of the dyestuff from 4:5-dichloro-7-methyl-3-hydroxythionaphthene and α-isatin-anilide of the formula

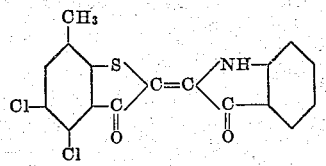

are introduced at 0–5° C. into a mixture of 192 parts of bromine and 6000 parts of sulfuric acid of 97 per cent. strength. After some stirring the whole is heated in the course of 12 hours to 45° C. and allowed to remain for a further 12 hours at 45–50° C. At the end of this time the bromination is complete, the sulfuric acid solution is poured upon ice and the dyestuff which separates is filtered, washed and dried. It is a violet powder, soluble in concentrated sulfuric acid to form a greenish-blue solution. The dyestuff forms an orange vat and dyes cotton violet tints of very good fastness.

The following table comprises further examples of dyestuffs obtainable from 4:5-dichloro-7-methyl-3-hydroxythionaphthene in accordance with the invention:

| 4:5 - dichloro - 7 - methyl-3-hydroxythionaphthene | Color of the dyestuff | Color in sulfuric acid | Color of the vat | Color of the dyed cotton |
|---|---|---|---|---|
| I. α - isatin - anilide | Violet | Violet | Orange | Red-violet |
| II. 5:7 - dibromisatin | Bordeaux | Violet | Olive | Bordeaux |
| III. p - dimethyl - amidoanil of 1-chloro-β,β₂-naphthiofurane-1:2-dione | Violet | Blue-green | Orange | Violet |
| IV. p - dimethyl - aminoanil of thionaphthenequinone-2:3 | Red | Green | Yellow | Bluish-red |
| V. p - dimethyl - aminoanil of 5 - chloro - 7 - methylthionaphthenequinone - 2:3 | Bluish-red | Green | Yellow | Bluish-red |

The dyestuff II corresponds with the following formula

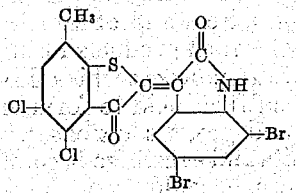

The dyestuff III corresponds with the following formula

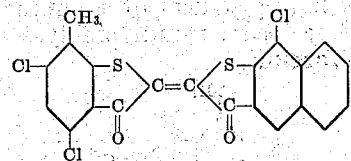

What I claim is:—
1. As a step in the manufacture of new indigoid dyestuffs the herein described production of dichloroacetyl-o-toluidine

$(CH_3 : NH-CO-CH_3 : Cl : Cl = 1:2:4:5)$ which consists in heating chloroacetyl-o-toluidine $(CH_3 : NH-CO-CH_3 : Cl = 1:2:4)$ with chlorinating agents.

2. As a step in the manufacture of new indigoid dyestuffs the herein described production of the dichloroacetyl-o-toluidine $(CH_3 : NH-CO-CH_3 : Cl : Cl = 1:2:4:5)$ which consists in heating chloroacetyl-o-toluidine $(CH_3 : NH-CO-CH_3 : Cl = 1:2:4)$ with chlorine.

3. As a step in the manufacture of new indigoid dyestuffs the herein described production of the dichloro-o-toluidine $(CH_3 : NH_2 : Cl : Cl = 1:2:4:5)$ which consists in heating dichloroacetyl-o-toluidine $(CH_3 : NH-CO-CH_3 : Cl : Cl = 1:2:4:5)$ with saponifying agents.

4. As a step in the manufacture of new indigoid dyestuffs the herein described production of the dichloro-o-toluidine $(CH_3 : NH_2 : Cl : Cl = 1:2:4:5)$ which consists in heating dichloroacetyl-o-toluidine $(CH_3 : NH-CO-CH_3 : Cl : Cl = 1:2:4:5)$ with alkalis.

5. As new products of manufacture, the herein described new indigoid dyestuffs of the general formula

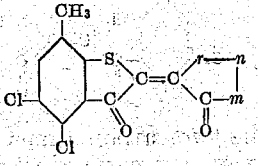

wherein $r$, $n$ and $m$ stand for atoms of which two are carbon atoms adjacent to each other, which at the same time appertain to an aromatic ring system and of which the third is NH, S or C, which products form red to violet and Bordeaux powders which dissolve in concentrated sulfuric acid to form violet, greenish-blue, and green solutions, yielding with hydrosulfite and caustic soda solution orange-brown, orange, yellow and olive vats from which cotton is dyed fast red to violet and Bordeaux tints.

6. As new products of manufacture, the herein described new indigoid dyestuffs of the general formula

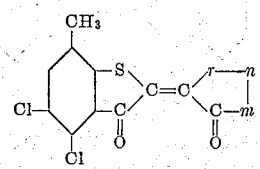

wherein $r$, $n$ and $m$ stand for atoms of which two are carbon atoms adjacent to each other, which at the same time appertain to an aromatic ring system of the benzene series, and of which the third is NH, S or C, which products from red to violet and Bordeaux powders which dissolve in concentrated sulfuric acid to form violet, greenish-blue, and green solutions, yielding with hydrosulfite and caustic soda solution orange-brown, orange, yellow and olive vats from which cotton is dyed fast red to violet and Bordeaux tints.

7. As new products of manufacture, the herein described new indigoid dyestuffs of the general formula

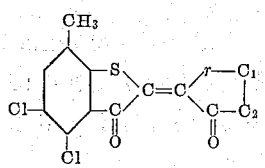

wherein $r$ represents NH or S, and the two carbon atoms $C_1$ and $C_2$ appertain to an aromatic ring system of the benzene series, which products form red to violet and Bordeaux powders which dissolve in concentrated sulfuric acid to form violet, greenish-blue, and green solutions, yielding with hydrosulfite and caustic soda solution orange-brown, orange, yellow and olive vats from which cotton is dyed fast red to violet and Bordeaux tints.

8. As new products of manufacture, the herein described indigoid dyestuffs of the general formula

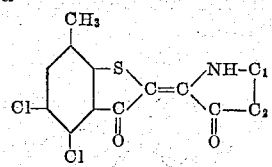

wherein the two carbon atoms $C_1$ and $C_2$ appertain to an aromatic ring system of the benzene series, which products form Bordeaux to violet powders, which dissolve in concentrated sulfuric acid to form violet and greenish-blue solutions, yielding with hydrosulfite and caustic soda solution olive and orange vats from which cotton is dyed fast red to red-violet and Bordeaux tints.

9. As a new product of manufacture, the herein described new indigoid dyestuff of the formula

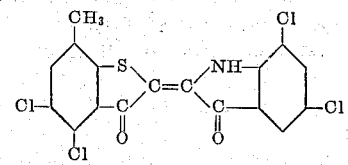

which forms a violet powder, dissolving in concentrated sulfuric acid to a greenish-blue solution, yielding with hydrosulfite and caustic soda solution an orange vat from which cotton is dyed fast violet tints.

In witness whereof I have hereunto signed my name this 13th day of January, 1930.

RICHARD TOBLER.